US012010976B2

(12) United States Patent
Herborn et al.

(10) Patent No.: US 12,010,976 B2
(45) Date of Patent: Jun. 18, 2024

(54) METHODS AND APPARATUS FOR LIVESTOCK REARING

(71) Applicant: GREENGAGE AGRITECH LIMITED, Manchester (GB)

(72) Inventors: Katherine Herborn, Birmingham (GB); Lucy Asher, Whitley Bay (GB); Peter Donoghue, Edinburgh (GB); Derek Liddle, Glasgow (GB)

( * ) Notice: Subject to any disclaimer, the term of this patent is extended or adjusted under 35 U.S.C. 154(b) by 0 days.

(21) Appl. No.: 17/430,515

(22) PCT Filed: Feb. 12, 2020

(86) PCT No.: PCT/GB2020/050329
§ 371 (c)(1),
(2) Date: Aug. 12, 2021

(87) PCT Pub. No.: WO2020/165587
PCT Pub. Date: Aug. 20, 2020

(65) Prior Publication Data
US 2022/0125021 A1 Apr. 28, 2022

(30) Foreign Application Priority Data

Feb. 12, 2019 (GB) ..................... 1901948

(51) Int. Cl.
*A01K 29/00* (2006.01)
*A01K 31/18* (2006.01)
*A01K 45/00* (2006.01)

(52) U.S. Cl.
CPC ............ *A01K 29/005* (2013.01); *A01K 31/18* (2013.01); *A01K 45/00* (2013.01)

(58) Field of Classification Search
CPC ...... A01K 29/005; A01K 31/18; A01K 45/00; A01K 31/22; A01K 15/02
See application file for complete search history.

(56) References Cited

U.S. PATENT DOCUMENTS 6,535,131 B1 * 3/2003 Bar-Shalom ......... A01K 29/005
340/573.2
7,963,254 B2 * 6/2011 Patton .................. A01K 11/008
381/56

(Continued)

FOREIGN PATENT DOCUMENTS

CN 107 094 633 8/2017
CN 108198562 6/2018

(Continued)

OTHER PUBLICATIONS

International Search Report for PCT/GB2020/050329 dated Aug. 3, 2020, 6 pgs.

(Continued)

*Primary Examiner* — Trinh T Nguyen
(74) *Attorney, Agent, or Firm* — Nixon & Vanderhye P.C.

(57) ABSTRACT

Apparatus for rearing livestock comprising a livestock enclosure, a plurality of sensors, and a plurality of output devices, and methods of operating the same. Methods of determining measurements of animal welfare by processing vocalisations by chicks, especially by detecting the spectral entropy of animal vocalisations. The relationship between chick distress calling in early life and outcome.

21 Claims, 12 Drawing Sheets

(56) References Cited

U.S. PATENT DOCUMENTS

| | | | |
|---|---|---|---|
| 8,223,980 B2* | 7/2012 | Dooling | G10L 25/00 |
| | | | 381/56 |
| 8,915,215 B1 | 12/2014 | Helgeson | |
| 9,807,981 B2 | 11/2017 | Berckmans et al. | |
| 10,080,343 B1* | 9/2018 | Chu | A01K 5/0114 |
| 2005/0049877 A1* | 3/2005 | Agranat | A01K 11/008 |
| | | | 704/E17.002 |
| 2016/0050888 A1 | 2/2016 | Berckmans et al. | |
| 2022/0159934 A1* | 5/2022 | Molloy | G06V 20/52 |

FOREIGN PATENT DOCUMENTS

| | | |
|---|---|---|
| EP | 2 978 305 | 2/2016 |
| JP | 2017-192317 | 10/2017 |
| KR | 10-0853756 | 8/2008 |
| KR | 10-1752399 | 6/2017 |
| KR | 10-1918762 | 11/2018 |
| WO | 2008/152433 | 12/2008 |
| WO | 2014/153626 | 10/2014 |
| WO | 2020/127449 | 6/2020 |

OTHER PUBLICATIONS

Written Opinion of the ISA for PCT/GB2020/050329 dated Aug. 3, 2020, 11 pgs.
Nicol et al., "Associations between welfare indicators and environmental choice in laying hens", Animal Behaviour, vol. 78, No. 2, Aug. 1, 2009, pp. 413-424.
Communication pursuant to Article 94(3) EPC issued for European Application No. 20 711 246.7 dated Dec. 12, 2022 (62 pages).

* cited by examiner ent of each of which are hereby incorporated by
METHODS AND APPARATUS FOR LIVESTOCK REARING This application is the U.S. national phase of International Application No. PCT/GB2020/050329 filed Feb. 12, 2020 which designated the U.S. and claims priority to GB Patent Application No. 1901948.8 filed Feb. 12, 2019, the entire contents of each of which are hereby incorporated by reference.

FIELD OF THE INVENTION

The invention relates to apparatus and methods for rearing livestock and for making measurements useful to inform livestock rearing.

BACKGROUND TO THE INVENTION

The invention addresses a number of problems relating to the rearing of livestock, and addresses improving animal wellbeing, growth and mortality reduction. In particular the invention seeks to provide farmers with an early indicator of welfare within the livestock farming environment, enabling them to make interventions to maximise farm productivity and improve animal welfare.

Chickens have over 20 context-specific calls (Collias and Joos, 1953) and it has been proposed to automate acoustic analytical approaches for the monitoring of poultry welfare, health and productivity in real-time, in order to promote earlier husbandry interventions (Manteuffel et al., 2004; Mcloughlin et al., 2019). It has been proposed to use machine learning approaches for classification, with algorithms trained on group-level recordings of healthy, productive high welfare or control flocks versus unhealthy, nonthriving, low welfare or experimentally stressed flocks. Typically, classification requires several combined markers, but when a single acoustic feature shows a pronounced, directional change with a welfare or productivity concern, then simple statistical approaches are possible. For example, the lowering in fundamental frequency that occurs with increasing vocal tract length may be used to monitor growth rate in broilers (Fontana et al., 2017). Automated detection of specific sounds via machine learning is computationally challenging in a commercial environment with often thousands of overlapping calls and background machinery noise. For rare and acoustically distinctive sounds (such as coughing in calves), a bottom-up approach is possible, with classification algorithms trained on the sound specifically rather than the group disease status (Vandermuelen et al., 2016).

It is known that young chickens (*Gallus domesticus*) make distress calls, which are repetitive, high-energy vocalisations having a distinctive shape (brief ascending then descending frequency modulation over time, with a duration of 100-250 ms), when they are stressed (Marx et al. 2001) and their association with negative emotional ('affective) states has been pharmacologically validated in laboratory studies (Sufka et al., 2006; Warnick et al. 2009). Distress calling is so reliably triggered by social isolation that it has been proposed as a screening assay for drug development (White and Sufka, 2012). There is good evidence that distress call monitoring may be a real-time and animal-centred marker of both emotional state and environmental concerns on poultry farms.

Nevertheless, it is difficult to monitor distress calls. They are currently monitored manually and may be affected by a number of factors, such as group behaviours or the presence of a stockperson.

The invention also seeks to address problems concerning the detection and monitoring of distress calls and their use to determine welfare parameters and outcome.

SUMMARY OF THE INVENTION

According to a first aspect of the invention there is provided a method of determining one or more welfare parameters (e.g. one or more stress parameters) of animals, the method comprising providing:
  a livestock enclosure; and
  a plurality of sensors arranged to make measurements in the livestock enclosure;
  the method further comprising determining one or more welfare parameters from the measurements made by the plurality of sensors and typically also outputting a determined welfare parameter.

According to a second aspect of the invention there is provided a method of regulating livestock rearing apparatus, the method comprising providing:
  a livestock enclosure (retaining a plurality of animals in use),
  a plurality of sensors arranged to make measurements in the livestock enclosure; and
  a plurality of output devices which control environmental parameters within the livestock enclosure;
  the method further comprising the step (typically carried out by a controller) of controlling the output from the plurality of output devices in dependence on the measurements made by the plurality of sensors.

The invention extends in a third aspect to livestock rearing apparatus comprising:
  a livestock enclosure (retaining a plurality of animals in use);
  a controller; and
  a plurality of sensors arranged to make measurements in the livestock enclosure;
  wherein the sensors are in electronic communication (whether wired and/or wireless) with the controller.

Typically the livestock rearing apparatus further comprises a plurality of output devices arranged to control environmental parameters within the livestock enclosure;
  wherein the sensors and output devices are in electronic communication with the controller and the controller is configured (e.g. programmed) to control the output from the plurality of output devices in dependence on the measurements made by the plurality of sensors.

Typically, the controller is configured (e.g. programmed) to calculate one or more welfare parameters of the animals (in the livestock enclosure in use) using the one or more sensors, for example by the method of the first or second aspects.

The controller may comprise a local controller, which is typically in electronic communication with the plurality of output devices and the plurality of sensors. The plurality of output devices and the plurality of sensors may be attached (e.g. demountably) and inductively coupled to conductors (e.g. wires, for example pairs of wires, e.g. twisted pairs) extending through (e.g. above the floor of) the livestock enclosure. The plurality of sensors may have a battery. The plurality of output devices may be controlled and the plurality of sensors may transmit data to the (e.g. local) controller through the same wires. The plurality of sensors may transmit data to the (e.g. local) controller through a wireless data communication (e.g. Wi-Fi, Bluetooth, or the like) (Wi-Fi is a trade mark of the Wi-Fi Alliance; Bluetooth is a trade mark of the Bluetooth Special Interest Group). The controller may comprise a remote controller, for example one or more server computers. The controller may comprise a remote controller which receives data from and optionally transmits data to a plurality of local controllers which control separate individual livestock enclosures.

The animals (in the livestock enclosure during use) may be avians. The animals may for example be poultry, such as chickens or turkeys. The animals may be mammals, e.g. ruminants, for example cows or sheep. The animals may be pigs. Typically animals are reared in batches.

The method may comprise measuring and/or determining one or more welfare parameters of the animals (in the livestock enclosure during use) using (measurements made by) the one or more sensors. The welfare parameters may be stress parameters (indicative of a level of stress in one or more animals—such as a thermal stress (that is the animal being too hot or too cold), stress due to a threat (e.g. a maternal signalling of a threat), stress due to high animal density, stress due to food or water restriction, stress due to social isolation, stress to environmental unfamiliarity, or a link to emotional state or welfare). Thus, the sensors may be used to detect signs of stress (e.g. visible or audible signs) given out by the animals. The controller may be configured to process measurements of the animals made by the one or more sensors to determine welfare (e.g. stress) parameters of the animals. Welfare parameters (e.g. stress parameters) are parameters indicative of the welfare of (e.g. stress in) individual animals, or groups of animals (for example different sub-groups of animals within the livestock enclosure or all of the animals within the livestock enclosure (e.g. a whole flock of avians or herd of ruminants)).

Typically, the plurality of sensors comprises one or more audio sensors. The method may comprise processing audio signals from the one or more audio sensors to detect sounds made by individual animals or by groups of animals. The controller may be configured to process audio signals from the one or more audio sensors to detect sounds made by individual animals or groups of animals. Audio sensors may process measured audio signals to detect sounds made by individual animals or groups of animals. Sounds measured by the one or more audio sensors may be processed to determine one or more welfare parameters of animals in the enclosure, or within a region of the enclosure around the respective one or more audio sensors. This may be carried out by the controller. The one or more parameters relating to the welfare of animals may comprise one or more stress parameters. It may be that the one or more parameters relating to the welfare of animals are not indicative of (or related to) a respiratory disorder or disease.

It may be that sounds made by groups of animals are analysed together, for example a recording of sounds (e.g. vocalisations) emanating from multiple animals may be processed by frequency domain digital signal processing. However, it may be that individual vocalisations by individual animals are detected and processed or it may be that sounds and vocalisation by groups of animals are analysed together. Sounds made by individual animals may be determined as being in one of a plurality of categories. The categories may comprise one or more categories indicative of stress. The categories may comprise one or more categories indicative of anxiety. The categories may comprise one or more categories indicative of depression. (Both anxiety and depression may be categories indicative of stress). The categories may comprise one or more categories indicative of positive well-being, e.g. happiness, contentment and/or good health.

Stress parameters may be determined by processing one or more noise parameters of the measured sound. Sound processing may comprise determining one or more stress parameters by calculating the spectral entropy of sound measured by one or more audio sensors. The spectral entropy of sound from an individual animal vocalisation may be determined or the spectral entropy of sound received from a plurality of animals may be determined. Calculating the spectral entropy may comprise calculating the Shannon entropy of the frequency spectrum of the received signal from one or more audio sensors. We have found that the spectral entropy is a good measurement of the rate of distress calling and so animal stress, in particular in early life animals. The method may comprise analysing the rate of distress calling and/or the spectral entropy specifically within a window of time (early in the life of the animals). For example, the windows may extend until a threshold time which is less than 8, less than 7, less than 6, or less than 5 days of life. Distress calling after the threshold time may be less indicative.

Spectral entropy measurements are especially useful in that they are not computationally intensive to calculate and we have found that they function as a single indicator (an "iceberg indicator") of weight gain and mortality rates and animal welfare. Low median daily spectral entropy in early life predicted low weight gain and high mortality, not just into the next day, but towards the end of production.

The method may comprise calculating a parameter related to the number of (e.g. frequency of) distress calls from the one or more animals. The frequency of distress calls is indicative of stress levels amongst the animals within the livestock enclosure. Typically, a higher frequency of distress calls is indicative of higher stress, but a frequency of distress calls below a threshold may be indicative of depression and so also indicate a raised stress level. Furthermore, the parameters advantageously distinguish between fast distress calls (indicating an animal is experiencing acute stress) and slow distress calls (chronic distress calls indicating that an animal is experiencing long term stress). Thus, it may be that parameters are calculated concerning each of acute distress calls and chronic distress calls.

The welfare parameters (e.g. stress parameters) of the animals may be calculated taking into account previous measurements or sounds (e.g. vocalisations) made by the same or different animals (e.g. batches of animals reared in the livestock enclosure), using the sensors. For example, they may be calibrated or modified taking into account previous measurements made using the sensors. In an example, measurements of stress parameters of the animals may be processed taking into account measurements of the frequency of distress calls at an earlier point in the life of the animals (e.g. in the case of chickens, the frequency of distress calls at one or more points during their third through sixth day of life, for example during their fourth day of life or during their fifth day of life, or during their third through fifth (for example) fourth day after placement in the livestock enclosure). We have found that prior stress levels and/or exposure to distress calls may affect subsequent behaviour of animals and so taking into account measurements of stress parameters earlier in the life of the animals in the enclosure enables a better measurement of their current welfare (e.g. level of stress).

The method may comprise detecting changes in the volume and pitch of vocalisations made by the animals, to calculate welfare parameters (e.g. stress, activity or health parameters) amongst the animals in the livestock enclosure.

The sound processing (to determine a one or more welfare parameters (e.g. stress parameters)) may comprise processing the frequency spectrum of sounds measured by one or more audio sensors and calculating one or more of: a spectral entropy parameter, a kurtosis parameter, a skewness parameter, an acoustic complexity parameter, a mean frequency, or standard deviation of the frequency of the acoustic signal from one or more audio sensors. Sound processing may comprise a filtering step. The filtering step may comprise passing the frequency spectrum of sounds measured by one or more audio sensors through one or more filters to isolate a frequency range specific to the distress call of interest. In an example, the frequency range may be 2.75 kHz to 5 kHz, e.g. for monitoring distress calls in chickens.

Parameters may be calculated individually using the data from individual audio sensors and then combined or otherwise processed together to calculate one or more parameters relating to the welfare (e.g. stress level) of animals in the enclosure or the audio data from a plurality of audio sensors may be processed together to calculate one or more parameters relating to the welfare (e.g. stress level) of animals in the enclosure.

Some or all of the sound processing, for example calculating one or more noise parameters (e.g. spectral entropy) may be calculated by processors of the microphones. The calculated one or more parameters may be transmitted to a (e.g. central) processor (e.g. of the controller). This reduces the amount of data which must be transmitted. It is advantageous that noise parameters (e.g. spectral entropy) can be calculated with relatively low computational load, making it practical to distribute the calculation of the one or more welfare (e.g. stress) parameters in this way.

It may be that a measurement of a mean frequency, a median frequency, a standard deviation of the frequency, a standard error of the frequency, a dominant frequency, upper and lower quartiles of the frequency, interquartile range of the frequency, or a centroid frequency of sounds measured by one or more audio sensors is correlated with animal welfare.

It may be that a measurement of skewness is inversely correlated with welfare, e.g. a negative skewness may be correlated with positive animal welfare and a positive skewness may be correlated with greater animal stress (e.g. distress or wellbeing).

It may be that a measurement of kurtosis is correlated with animal welfare. It may be that a measurement of kurtosis is correlated with animal stress (e.g. distress or wellbeing).

The one or more sensors may comprise optical sensors, for example cameras. Data measured by the optical sensors may be processed to determine welfare parameters, e.g. relating to the health of individual animals, or the health of the group of animals in the livestock enclosure as a whole. One or more optical sensors may be thermal imaging cameras. We have found that for chickens their comb temperature is indicative of their welfare. Data from the thermal imaging sensors may be processed to determine the temperature of the comb of one or more chickens, which can be related to the welfare (e.g. stress) of the chickens and so used to calculate a welfare parameter of the chickens. Video imagery may also be processed to determine disease, e.g. foot health, and infection, in animals within the livestock enclosure.

Furthermore, it may be that data from one or more optical sensors are taken into account in (e.g. used to interpret, calibrate or adjust) calculations of the welfare (e.g. stress) parameters, for example, when determining one or more welfare (e.g. stress) parameters from the measured sound (e.g. by processing one or more noise parameters of the measured sound, for example spectral entropy). The data from one or more optical sensors may be processed to determine one or more livestock (e.g. chicken) distribution parameters in the livestock enclosure (e.g. in proximity of one or more sensors) and the one or more livestock distribution parameters may be used when determining one or more welfare parameters. For example, the relationship between livestock distribution and microphone location may be used to interpret, calibrate or adjust calculations of the welfare (e.g. stress) parameters from the measured sound (e.g. by processing one or more noise parameters of the measured sound, for example spectral entropy).

The one or more sensors may comprise one or more environmental sensors. The one or more environmental sensors may measure one or more of humidity, ammonia concentration, carbon dioxide concentration, temperature, or light levels in the animal enclosure.

The method may comprise processing measurements from the one or more sensors taking into account the age of animals in the enclosure, or relative to a reference time, for example the start of rearing a batch of animals in the livestock enclosure. This may include comparing measurements (e.g. of welfare parameters) with reference values. The controller may be configured (e.g. programmed) to correlate measurements of the one or more sensors with the age of animals in the enclosure, relative to a reference time. The controller may comprise a clock. The controller may store a time at which a batch of animals started to be reared in the livestock enclosure or may determine and take into account the age of a batch of animals.

The method may comprise determining welfare parameters, particularly stress parameters, early in the life of animals (e.g. in the first week), using measurements made by the plurality of sensors, and taking this into account in subsequent control of the output devices or when processing subsequent measurements (e.g. at least a day, or at least a week later) made by the sensors to determine welfare parameters. In the case of the animals being chickens, the method may comprise detecting levels of stress in the animals in the livestock enclosure during their third, fourth, fifth or sixth day since hatching, or placement in the livestock enclosure (preferably the fourth day from hatching or the fourth day from placement in the livestock enclosure) in particular. We have found that stress levels, indicated by distress calls in chickens, during their fourth day since hatching or fourth day from placement in the livestock enclosure, are especially indicative of their welfare and ultimate growth.

Typically, in response to the measurements made using the one or more sensors, the output from the one or more output devices is regulated, and varied over time. Thus the environment in the animal enclosure is regulated, and varied over time. This enables animal welfare and/or growth to be optimised.

The output devices control environmental parameters within the animal enclosure, for example lighting levels, sounds, temperature etc.

It may be that at least some of the output devices are lights. The outputs which are changed may include the level of light output by the lights and/or the colour of light output by the lights and/or the wavelength spectrum of light output by the lights (which may include switching off white lights and switching on blue lights, or vice versa). One of more of the output devices may be temperature or humidity controllers (e.g. heaters or air conditioning units or humidifiers), which can thereby be controlled to regulate the temperature or humidity in the animal enclosure, or one or more regions within the animal enclosure.

One or more of the output devices may be a sound generator, such as a loudspeaker, configured to direct sound at animals within the enclosure. The one or more sound generators may be controlled (e.g. by the controller) to output animal vocalisations indicative of animal pleasure or distress. We have found that animals, such as chickens, have social contagion in emotions, passed on through the vocalisations that they make such as distress calls and pleasure calls. The one or more welfare parameters may comprise or consist of a measurement of (e.g. frequency of) pleasure calls or distress calls. The method may comprise generating animal vocalisations when the animals are at predetermined ages (e.g. in the first week of life in the case of chickens), or in response to measured welfare parameters (e.g. stress parameters), for example to regulate the welfare of (e.g. limit stress of) animals in the animal enclosure.

Accordingly, by outputting animal vocalisations, the welfare and growth of the animals in the livestock enclosure may be regulated. It may be that animal vocalisations recorded by the one or more audio sensors are processed and used to regulate the output of animal vocalisations, e.g. distress calls and pleasure calls. This may be carried out in real time. Or it may be that output of animal vocalisations at a later time, e.g. to a subsequent group of animals, is varied.

It may be that one or more welfare parameters (e.g. stress parameters), for example measurements of animal vocalisations (e.g. the frequency of distress calls), are measured during the rearing of a first group of animals in the livestock enclosure and environmental parameters, including the variation with time of environmental parameters, are varied during the subsequent rearing of a second group of animals in the same or another livestock enclosure.

It may be that measurement of one or more welfare parameters (e.g. stress parameters), for example measurements of animal vocalisations, are measured during the rearing of a first group of animals in the livestock enclosure and environmental parameters, including the variation with time of environmental parameters, are varied during the subsequent rearing of a second group of animals in the same or another livestock enclosure.

In addition to controlling environmental parameters by controlling output devices, or instead, the method may comprise outputting data, e.g. through a user interface, such as a loudspeaker, or screen, or through an electronics communications interface, e.g. by email or text message, which can be used by stockpeople (e.g. farmers) to vary aspects of the environment in the animal enclosure, either during the rearing of a current group of animals in the livestock enclosure or during a subsequent rearing of a second group of animals in the livestock enclosure (e.g. a subsequent flock of chickens).

Machine learning may be employed to correlate welfare parameters determined from measurements from the one or more sensors, and interventions, which may be carried out by varying the output of the one or more output devices, or by stockpeople in response to data output through a user interface, to thereby optimise animal welfare and/or growth during the rearing of an individual group of animals, or during future rearing of a new group of animals in the same or another livestock enclosure. For example, environmental parameters, including a time variation of environmental parameters, or the way in which environmental parameters, including a time variation of environmental parameters, are varied in real time in response to measurement from the one or more sensors may be varied as a result.

The one or more audio sensors may, for example, be located between 0.5 m and 1.5 m above the floor of the animal enclosure. They may be located spaced (e.g. equally) between drinkers and feeders. Individual sensors may for example have a radial acoustic range of up to 10 m or up to 25 m. They may have a frequency response extending at least between 20 Hz and 20 kHz. Sound may be filtered to isolate a range, which is typically in the range 1 kHz to 10 kHz, for example 2.75 kHz to 5 kHz. Audio processing may include bandpass filtering, or a high-pass filter followed by low-pass filter.

Discrete time windows of audio signals may be analysed. Sound that is analysed may be of a predetermined duration, for example 1 minute. Sounds may be analysed for at least 10 seconds or at least a minute each time measurements are to be determined. It may be that measurements are to be determined every 10 to 60 minutes.

The method may comprise predicting next-day mortality amongst the animals in the livestock enclosure. The method may comprise correlating preventative actions (such as increasing temperature, reducing temperature, providing more or less food changing light brightness or frequency range), and their subsequent effect on next-day mortality. The method may comprise receiving data concerning mortality of animals within the animal enclosure. The method may comprise receiving data concerning the weight of animals within the animal enclosure. The controller may have an interface, e.g. a user interface, for receiving mortality data and/or weight data.

The method may comprise analysing weight gain of one or more of the animals in the livestock enclosure, for example a measurement of the weight of the animals at the end of a growing cycle. This may be taken into account when determining environmental parameters, or the relationship between outputs through the output devices in response to measurement using the sensors during subsequent growing cycles.

The method may comprise outputting one or more key performance indicators indicative of the productivity of the animal rearing facility.

The method may comprise regulating the output of the one or more output devices to reduce stress on the animals within the animal enclosure, e.g. responsive to a calculated welfare parameter (e.g. a stress parameter, such as frequency of distress calls) meeting one or more criteria. The controller may be configured to vary the output of the one or more output devices to reduce stress on the animals within the animal enclosure, e.g. responsive to a calculated welfare parameter (e.g. a stress parameter, such as frequency of distress calls) meeting one or more criteria.

The method may comprise regulating the frequency spectrum of light output through one or more lights (being examples of output devices), or to change (e.g. increase or decrease) the temperature in the animal enclosure, or to provide a different (typically greater) amount of food or water, to reduce animal stress. The controller may be configured to control one or more lights to vary the frequency spectrum of light output by the one or more lights, or to control one or more heaters, coolers, humidifiers or dehumidifiers to thereby reduce animal stress.

For example we have found that blue light levels, or the ratio of blue light to red and green light, may be increased to reduce stress. We have found that blue light at wavelengths of around 440 nm to 470 nm (e.g. around 455 nm) are especially helpful in reducing stress.

The livestock enclosure may be a building.

The invention extends in a fourth aspect to a data storage medium storing computer program instructions which when executed by the controller of livestock rearing apparatus according to the second aspect of the invention, cause the livestock rearing apparatus to carry out the method of the first aspect of the invention.

The invention extends in a fifth aspect to a method of determining one or more welfare parameters (e.g. one or more stress parameters) of animals using one or more audio sensors to detect sounds (e.g. vocalisations) made by individual animals or groups of animals and outputting a determined welfare parameter. The one or more audio sensors are used to make measurements (in the livestock enclosure). One or more welfare parameters are determined from the measurements. The determining of one or more welfare parameters is as described above, for example, one or more stress parameters may be determined by calculating the spectral entropy of sound measured by one or more audio sensors.

Optional features disclosed herein are optional features of each aspect of the invention.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
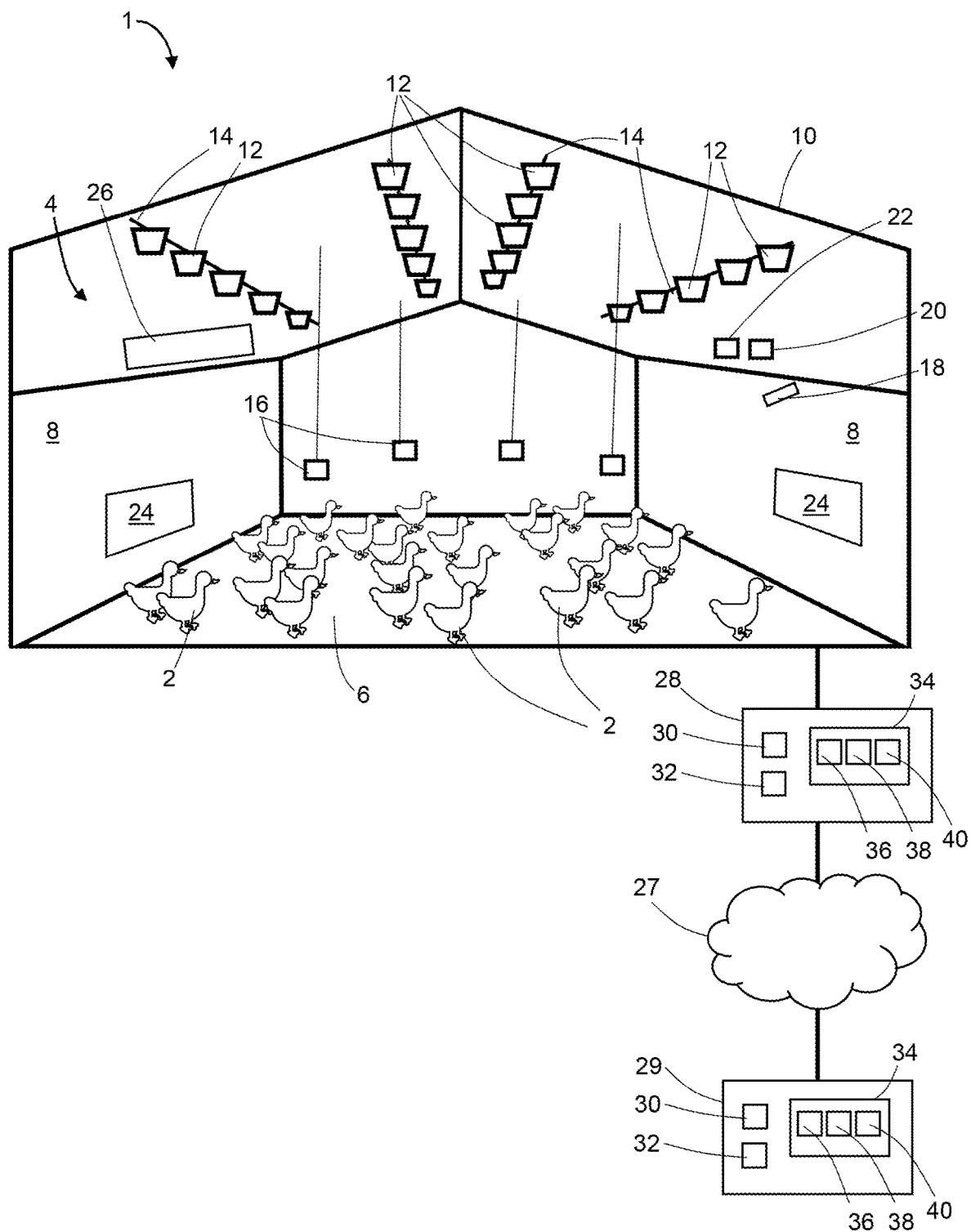
FIG. 1 is a schematic perspective view of a livestock enclosure.

FIG. 1 is a schematic diagram of livestock rearing apparatus 1 for rearing animals 2, in this example chickens. The apparatus includes a livestock enclosure, in this case a shed 4 having a floor 6, walls 8 and roof 10 on which are located a plurality of individually controllable light sources 12. These light sources are inductively coupled to and hanging from wires 14 which are strung along the length of the animal enclosure. They may be individually added to, removed from, and slid along the wires. The wires are typically twisted pairs, which conduct an AC current to power the light sources.

In addition, a plurality of microphones 16 are suspended within the enclosure, about 75 cm above the floor of the enclosure. They are used to record sounds from the animals during operation. These microphones are inductively coupled to and hanging from wires 14 which are strung along the length of the animal enclosure (not shown in FIG. 1). Thermal imaging cameras 18 are also provided to view a region of the enclosure and other environmental sensors 20, such as gas sensors, humidity sensors, temperature sensors, light sensors are also present. These cameras are inductively coupled to wires 14 which are strung along the length of the animal enclosure (not shown in FIG. 1). There are also a number of output devices, other than the lights, which can be used to regulate other aspects of the environment of the animal enclosure, for example heaters 24, and air conditioning units 26, and so forth.

The livestock rearing apparatus is controlled by a controller, which comprises a local controller 28 and a remote controller 29, to which the local controller periodically connects through the Internet 27. The local controller 28 comprises a processor 30 which has a clock 32. There is also memory 34, storing computer program data 36, measurement data 38 (e.g. reading from sensors) and operating parameter data 40, which is used to control the various outputs. The remote controller 29 may correspond although typically it is a more power computer which processes data from and which may in part control a plurality of different apparatuses.

In some embodiments, each of the plurality of microphones 16 comprise a micro-controller and data storage. The data storage stores computer program code which, when run by the micro-controller, causes the micro-controller to process audio data received at the microphone. That is, the micro-controller of each microphone filters and processes the audio data—i.e. before data is transmitted to the local controller 28 (or to the remote controller 29). The processing carried out within the microphones may include filtering and calculation of spectral entropy, for example.

In some embodiments, the apparatus is controlled entirely by a remote controller, e.g. a server located in the cloud, or entirely by a local controller, but it is convenient to provide a local controller which receives signals from sensors and regulates the various output devices, and which periodically provides data to or receives instructions from a remote controller (e.g. internet server). The remote server may also provide central recording, reporting, machine learning and so forth.

Figure 2:
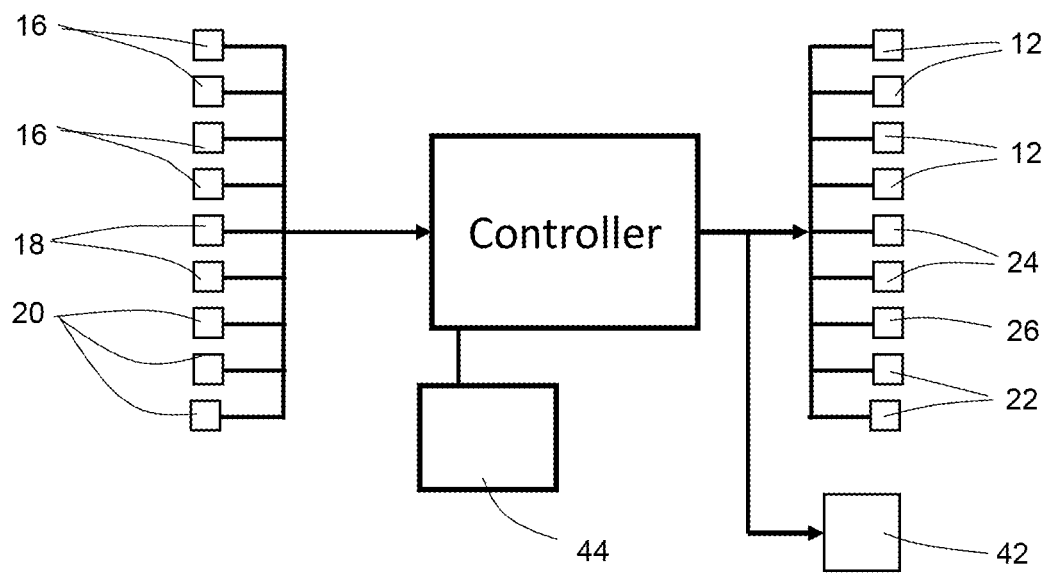
FIG. 2 is a schematic diagram of a local controller.

With reference to FIG. 2, the controller receives data from the various sensors, including the microphones 16, thermal imaging cameras 18, and other environmental sensors 20. In turn, the controller controls a number of output devices in real time, including the various lights 12, heaters 24, air conditioning unit 26, possibly loudspeakers 22, and so forth. The controller is also operable to output data to a user interface 42, to communicate with a stock person. The user interface 42, may be a display screen, which may be local to the animal rearing apparatus, or may be remote. For example, the controller may provide a web portal, or provide data to a mobile phone app, through which a stock person may receive data concerning the performance of the animal rearing apparatus, or the status of the animals in the animal rearing apparatus, the user interface may transmit text messages or emails or other alerts to a user during operation.

The controller also stores measurement 38, and data calculated from those measurements, such as measurements of animal welfare parameters, for current or future use.

Figure 3:
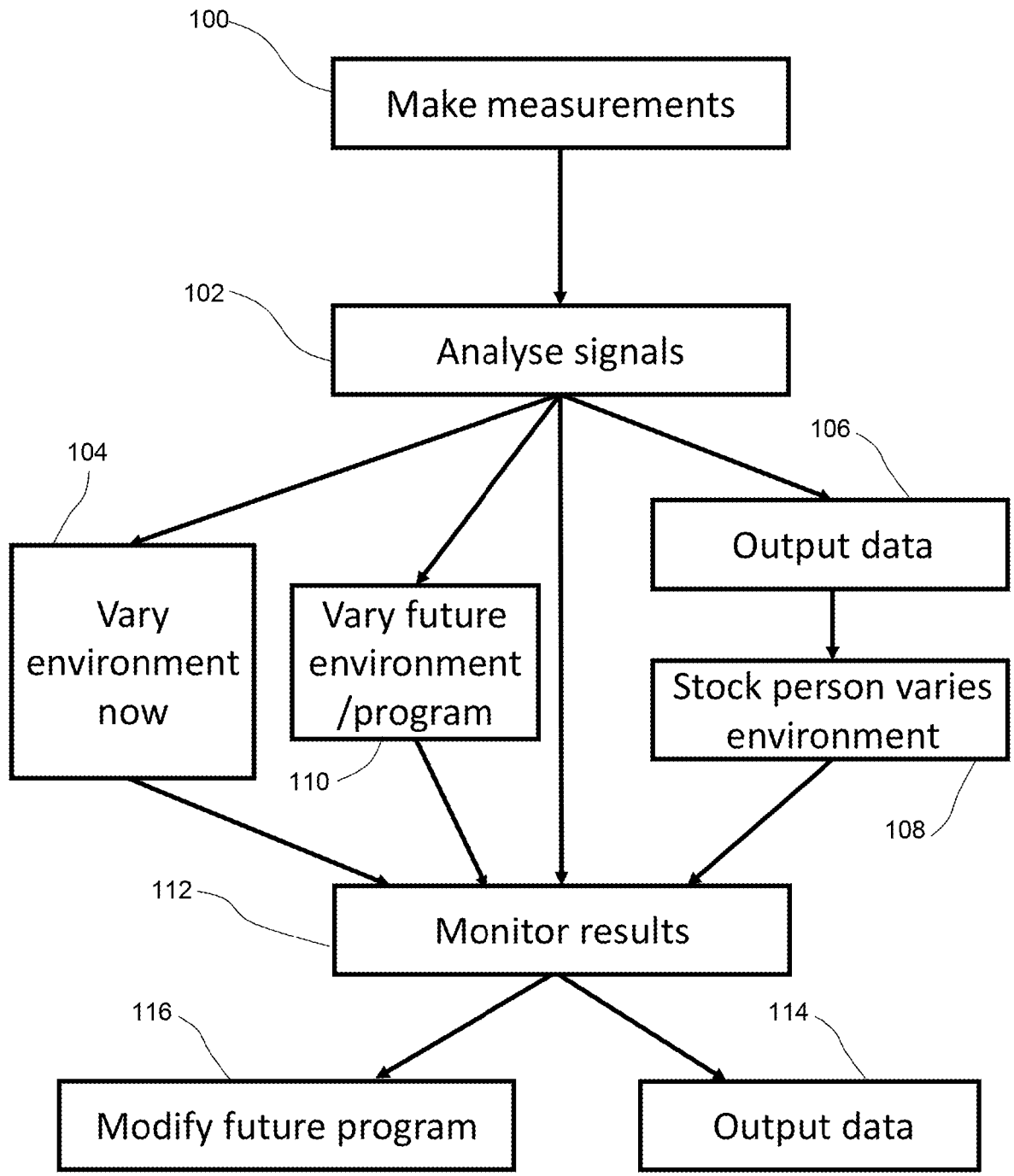
FIG. 3 is a flow chart of an operating procedure.

With reference to FIG. 3, during operation, while animals are reared in the animal enclosure, measurements are made 100, using the various sensors. As described below these measurements may include measurements of audio signals indicative of distress, or other sounds are vocalisations made by animals, as well as environmental parameters and so forth. Data may also be input manually by a stock person and stored. When a group of animals are reared in the enclosure, their age or the time at which the program starts is recorded, which enables environmental properties to be varied with the age of the animals, and also enables measured data to be correlated with the age of the animals.

The measured data is then analysed 102, typically in real time, by the controller, which then controls the output devices, to vary 104 the current environment within the animal enclosure. For example, the controller may change the temperature, or humidity, or the intensity or frequency spectrum of the lighting within the animal enclosure, or within individual parts of the animal enclosure, responsive to the measurements which are made. Thus, factors affecting animal welfare may be automatically optimised. Typically, the environment is also controlled according to a program, taking into account the age of the animals (e.g. the time since a group of animals, e.g. a flock of chickens, were introduced into the animal enclosure), and other parameters such as the time of day. For example, lighting levels may be varied to give a day/night cycle, the properties of which may change with time as the animals age. Furthermore, changes are made to the environment and the program by which it is varied responsive to the measurements which have been made.

In addition, the controller may output information 106 to a stock person who may, at their discretion, vary the environment 108 within the animal enclosure, for example by making changes to fixtures or fitments, or the number of animals, which cannot be made automatically by the controller, using the one or more output devices which are available to it. It is also possible that a stock person will be asked to make certain checks, for example to check the health of the animals within the enclosure, and the stock person may feed data back, for to the controller, for example, measurements of animal health or other observations and which they make, at the prompt of the controller.

In addition, as well as varying the immediate environment, the controller may determine future changes in the environment, for example changes which will occur during the later feeding cycle, or night cycle, or the following day, or during the rearing of a further group of animals in the future.

The controller also monitors parameters indicative of the performance of the animal rearing apparatus, for example measurements of the weight or health of the livestock, mortality rates, or the response of animals in the animal enclosure to the changes which are made to the environment by the output devices, or by a stock person, typically responsive to a signal given to the stock person. This data is later used to output relevant data, such as key performance indicators, and also to modify a future programme to be followed by the controller when raising a later group of animals in the animal enclosure.

Modifications to the future programme may include changes in environmental factors (temperature, lighting spectrum and intensity, food and drink amount), including changes to the program which determines environmental parameters change with time, for example varying a day/night cycle, or increasing or decreasing or changing the wavelength distribution and of lighting at different times, for example times during the lifespan of the animals in the animal enclosure.

Modifications to the future programme, may also be modifications to the way in which output devices are controlled in real time in response to measurements made using the various sensors. Machine learning algorithms may be employed to determine optimum operating parameters, taking into account measurements, and results from the individual animal enclosure, and also many other animal enclosures over time.

Figure 4:
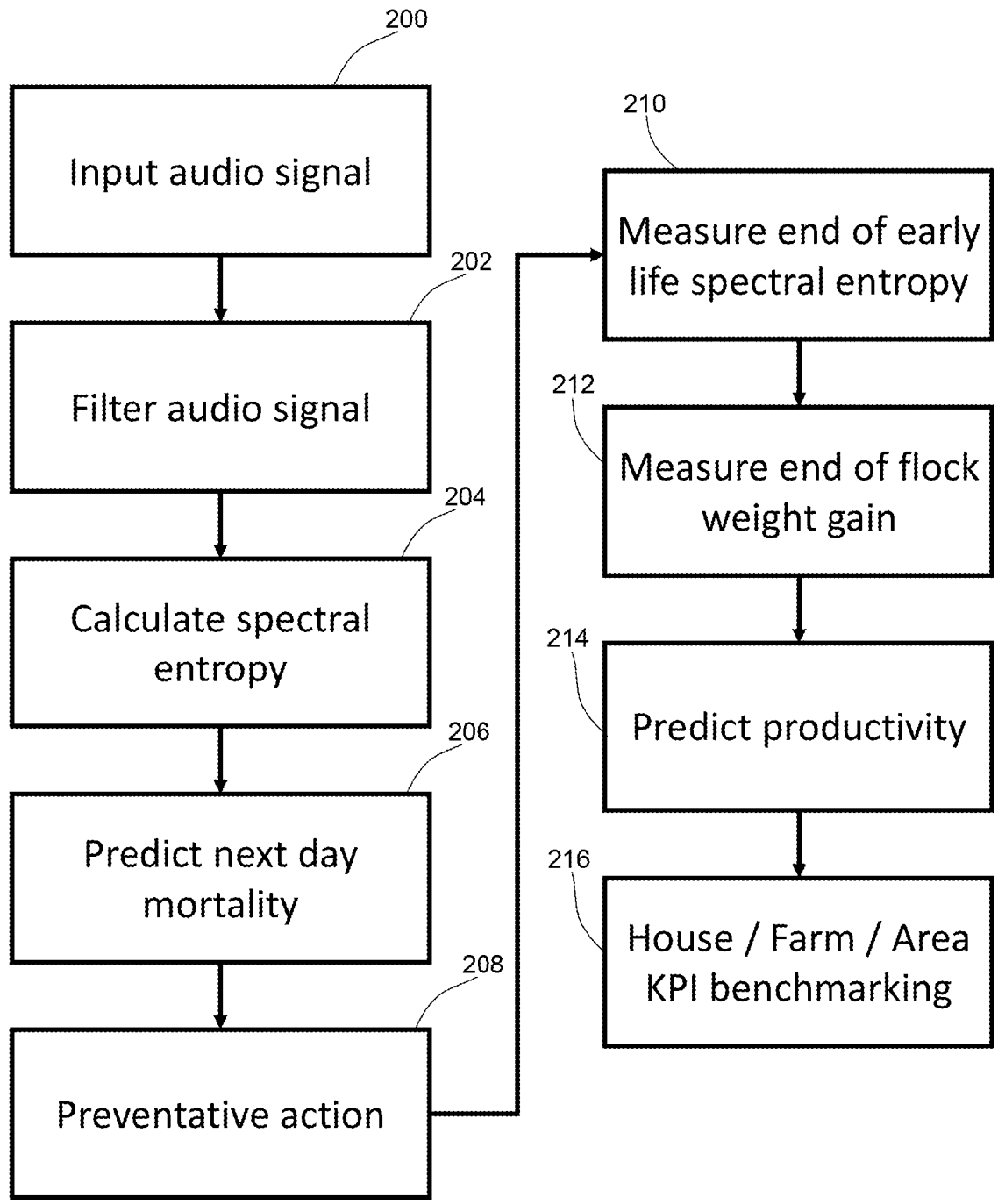
FIG. 4 is a flow chart of an operating procedure.

FIG. 4 is an example implementation of the operation. An audio signal 200 from a microphone is received, typically at the controller. Samples of audio signals are taken within 4 hours of arrival of chicks into the livestock enclosure, typically between the first and fourth hour of arrival, and regularly repeated, typically with a minimum interval of 4 hours between samples. It may be that samples are not taken during periods which would otherwise trigger calls, such as feeding time or the presence of a human in the livestock enclosure. In this example, the audio signal 200 is emanated from a chick or a group of chicks (which may, for example, include as many as several thousands of chicks). The received audio signal is filtered 202, e.g. by passing through one or more digital filters, to isolate a frequency range (for example, typically 2.75 kHz to 5 kHz for early life chicks), and the spectral entropy of the filtered signal is calculated 204. This is a parameter which indicates the number of distress calls per unit time within the livestock enclosure. It may be that filtering the received audio signal includes using short-time Fourier transform (e.g. with a 512 sample, non-overlapping Hanning window). It may be that the parameters calculated from the audio signal also, or alternatively, comprise one or more of the mean, median, standard deviation, standard error, dominant frequency, upper quartile, lower quartile, interquartile range, centroid, skewness, or kurtosis of the audio signal. Next day mortality is predicted 206 based on the number of distress calls per unit time indicated by (and calculated from) the spectral entropy (and optionally, or alternatively, any other calculated parameters). For example, next day mortality may be more likely if there are more distressed signals within the livestock enclosure. Additionally, or alternatively, the calculated parameter may be correlated with previously measured data (e.g. data from a remote controller) to predict next day mortality. For example, the calculated parameter may be sent to a remote controller for correlation, or the filtered audio signal is sent to a remote controller to calculate distress calls and correlate to predict next day mortality. Preventative action 208 may be taken if the next day mortality prediction is high. This action may be determined and/or performed automatically, e.g. based on previous actions, or it may be determined and/or performed by a stock person. The preferable preventative action is to change the lighting frequency, by increasing the blue light levels in the range 440 nm to 475 nm (optimally 455 nm) to reduce stress in the birds. Alternative, or additional, preventative actions include altering the temperature or humidity of the livestock enclosure, allowing longer time for feeding or for access to water, playing calming sounds via loudspeakers and/or any other action to reduce stress in the birds.

When the flock has reached the end of their early life, e.g. the fourth, fifth or sixth day of placement, the spectral entropy of filtered audio signals (which is again indicative of mean distress call levels per minute) is measured 210. This is correlated with measured weight gain 212 to predict productivity 214 of the flock. Key performance indicators (KPI) are calculated 216 and to be used as benchmarks for future early life flocks. For example, certain preventative actions may be more efficient for specific next day mortality predictions and/or for flock weight gain. It may be that the KPI benchmark is used when determine whether to take preventative action at step 208, and/or what action to take, and whether the preventative action is to be performed automatically or by a stock person.

Figure 5:
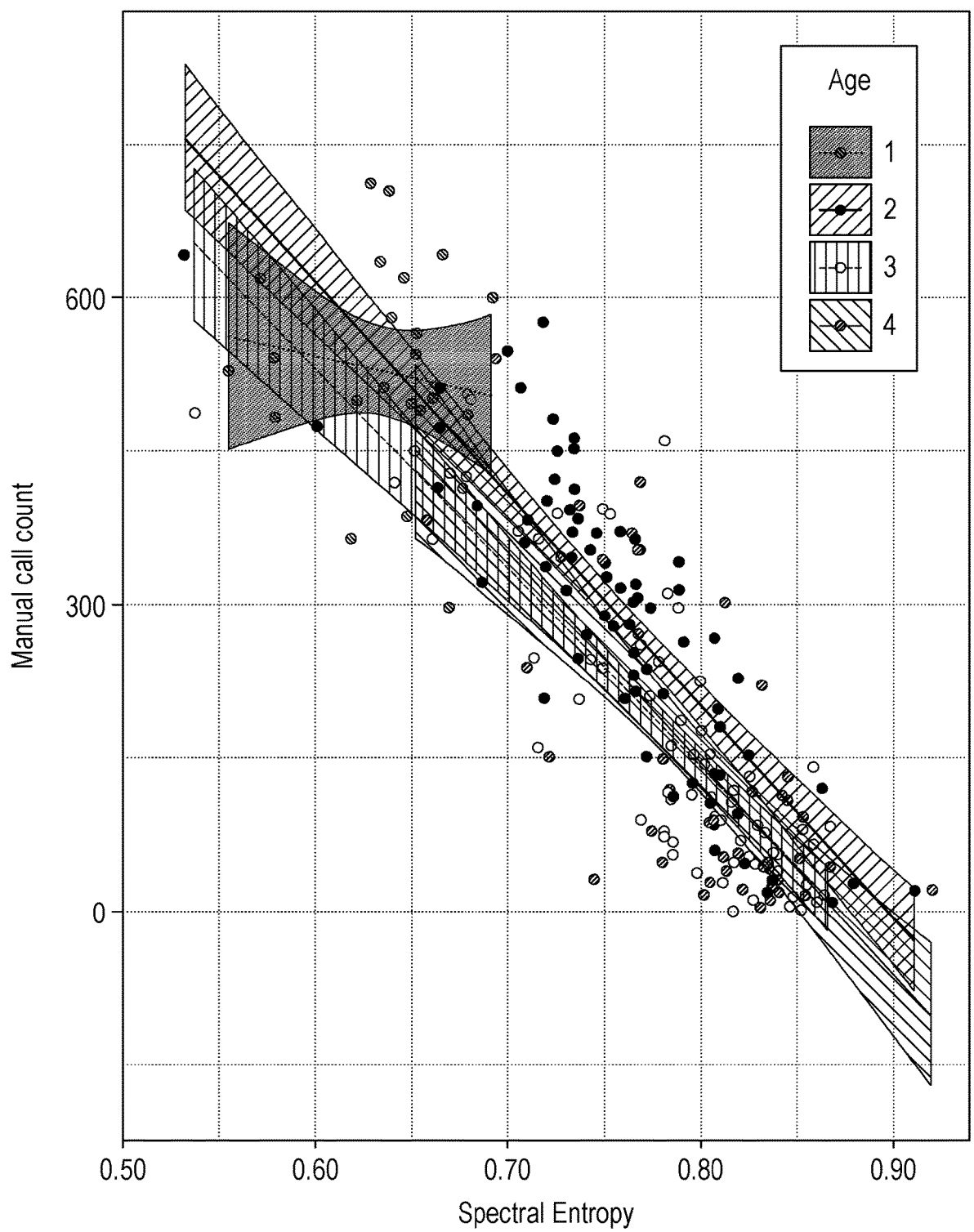
FIG. 5 is a graph showing a relationship between spectral entropy and manual count of distress calls per minute for different ages.

FIG. 5 demonstrates the relationship between spectral entropy, extracted from high-pass filtered data, and manual count of distress calls per minute for different ages of chickens (in days). Shaded areas denote confidence intervals.

Figure 6:
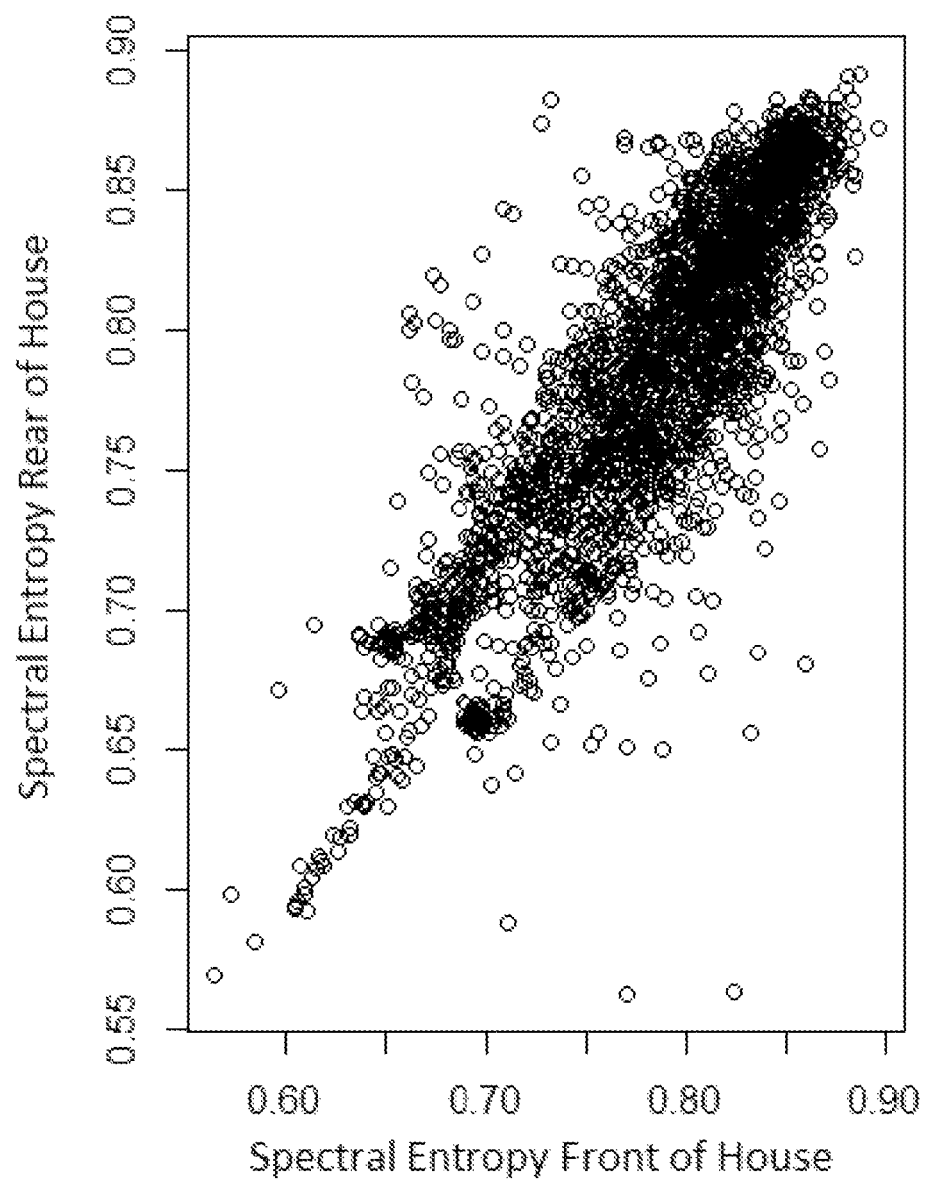
FIG. 6 is a graph showing a correlation between spectral entropy and recording from the front and rear of an enclosure.

FIG. 6 is a correlation between spectral entropy extracted from high-pass filtered data from time matched 1 min recordings from the front and rear of the house (i.e. livestock enclosure). It may reflect spatial variation in stress exposure, distressed birds and/or acoustic attributes of the house. We have found that different areas of a livestock enclosure may give different results depending for example on performance of the acoustic sensors, the age of the chicks at different locations and acoustic properties of the livestock enclosure. The methods may comprise controlling for location specific variations.

Figure 7:
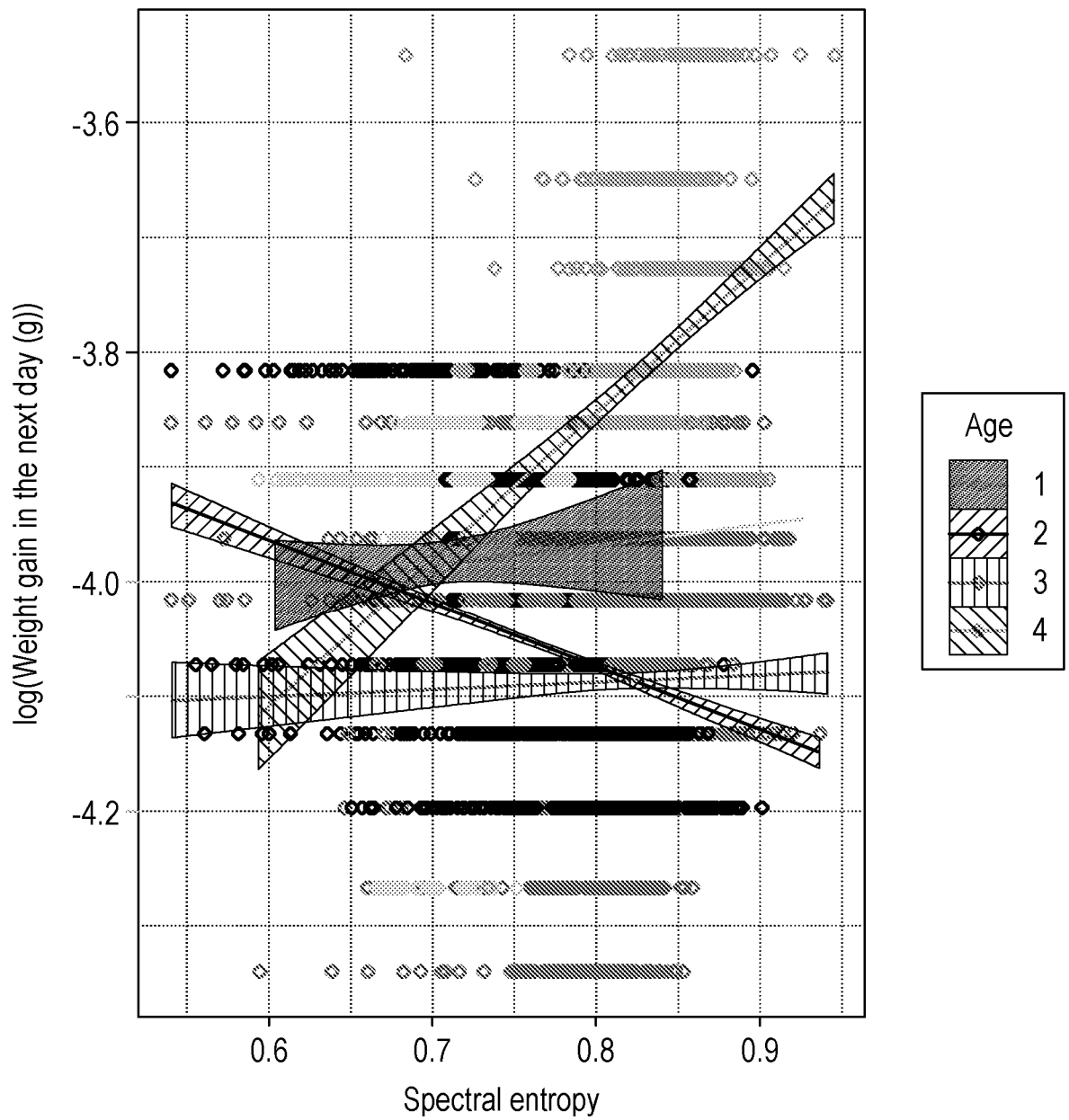
FIG. 7 is a graph showing a relationship between spectral entropy and weight gain.

FIG. 7 is an age-specific relationship between spectral entropy extracted from high-pass filtered data and weight gain (logarithmic) in the next day. On days 1-3, spectral entropy became increasingly negatively correlated with weight gain into the next day, i.e. flocks which distress called most then had highest weight gain. However, this relationship was reversed on day 4, when continued high rates of distress calling were associated with lower weight gain. It is therefore advantageous to determine welfare parameters taking into account the age of the livestock.

Figure 8:
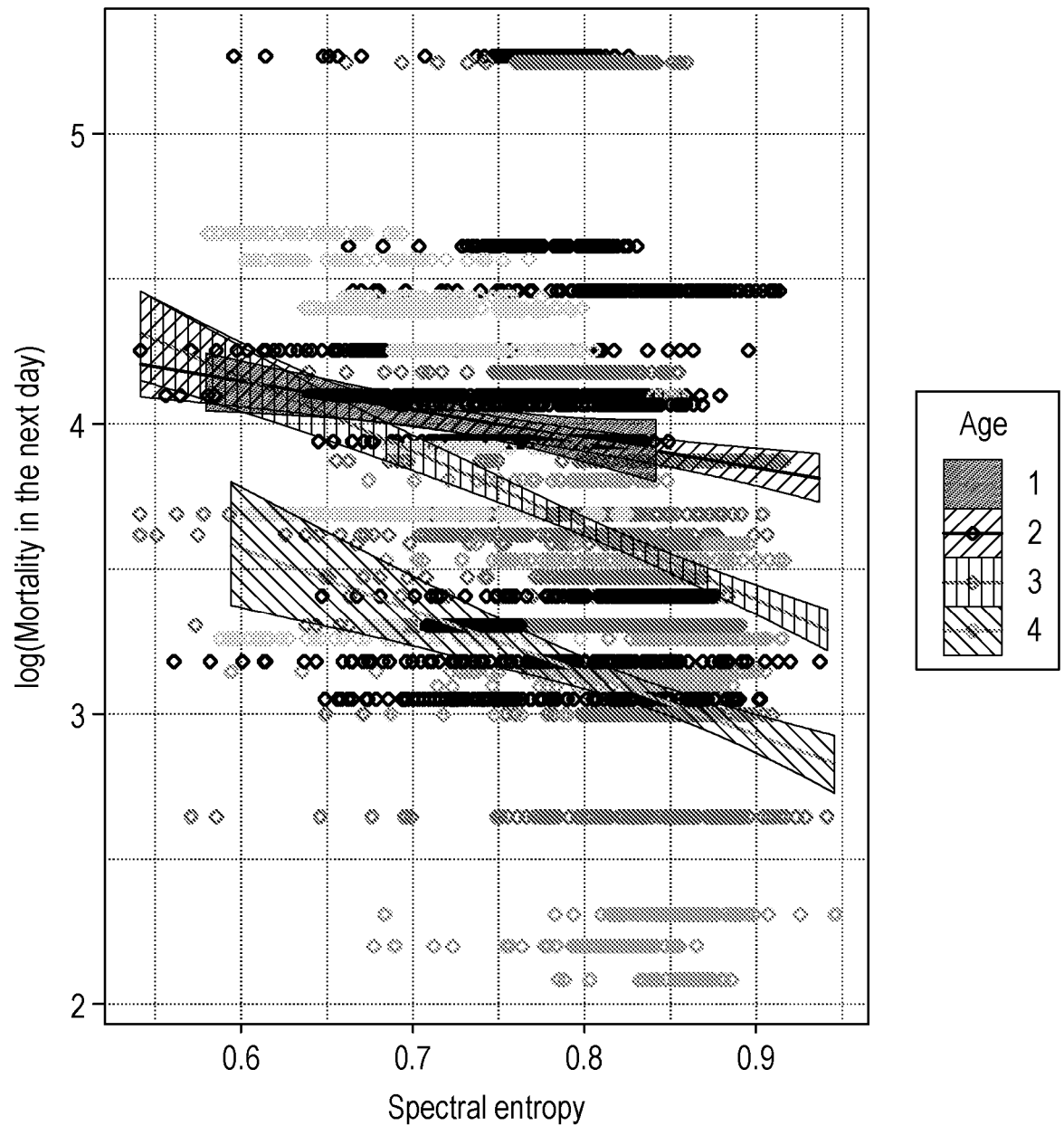
FIG. 8 is a graph showing a relationship between spectral entropy and mortality.

FIG. 8 is an age-specific relationship between spectral entropy extracted from high-pass filtered data and mortality (logarithmic) in the next day. Shaded areas denote confidence intervals. Across days 1-4, spectral entropy became increasingly negatively correlated with mortality in the next day, i.e. flocks which distress called most had highest mortality.

Figure 9:
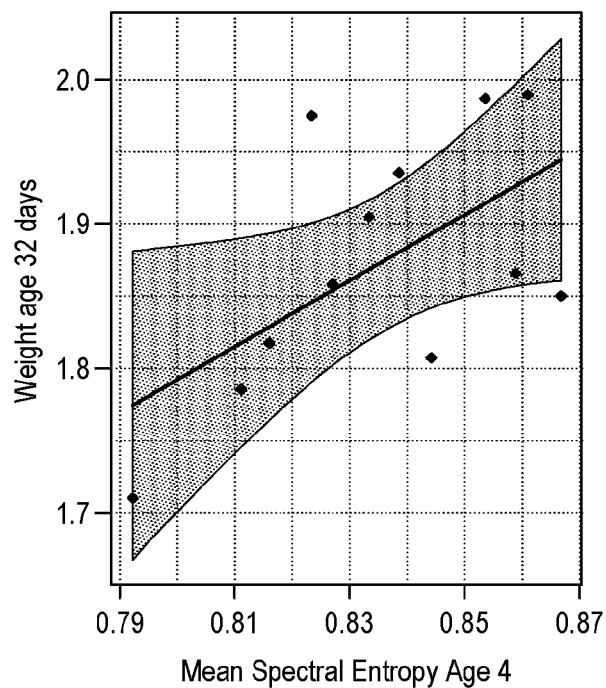
FIG. 9 is a graph showing a relationship between spectral entropy and flock weight.

FIG. 9 is a relationship between spectral entropy extracted from high-pass filtered data at 4 days from placement and flock weight at 32 days. In stepwise backward regressions of 32-day weight, the sole predictor was day 4 spectral entropy (slope 2.27±0.98, t=2.31, p=0.044): high rates of distress calling on day 4 predicted low weights at day 32.

Figure 10:
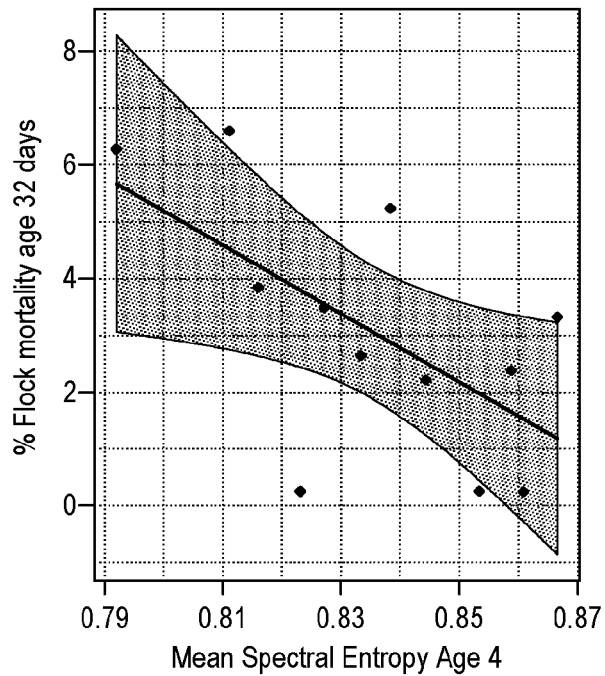
FIG. 10 is a graph showing a relationship between spectral entropy and flock mortality.

FIG. 10 is a relationship between spectral entropy extracted from high-pass filtered data at 4 days from placement and flock mortality (percentage) by 32 days. Shaded areas denote confidence intervals. In stepwise backward regressions of 32-day % Flock mortality, the sole predictor was again day 4 spectral entropy (slope −60.21±24.21, t=−2.49, p=0.032): high rates of distress calling on day 4 predicted high % flock mortality by day 32.

Figure 11:
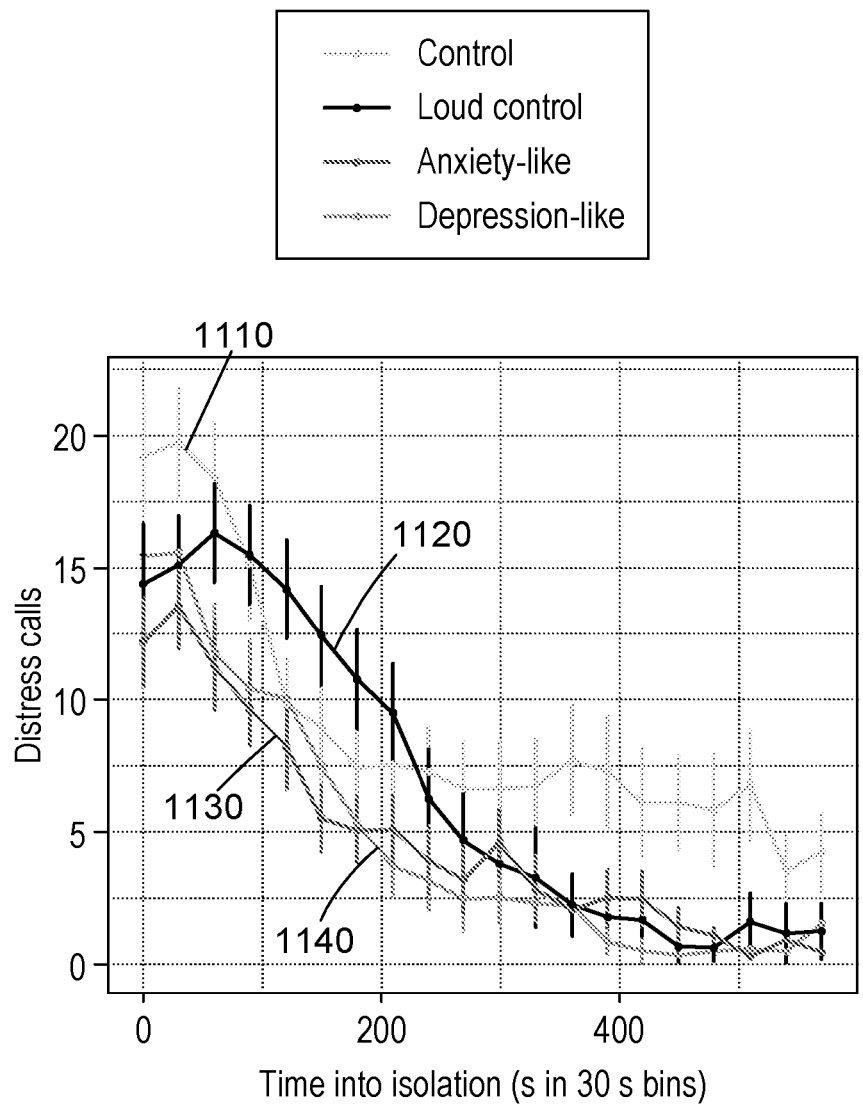
FIG. 11 is a graph showing a relationship between change in distress call rates over time in isolation.

FIG. 11 is a relationship between the change in distress call rates over 10 minutes in isolation. The relationship is shown for different audio playback treatments: a control 1110, a loud control 1120, anxiety-like playback 1130, and depression-like playback 1140. Error bars indicate 1 standard error of the mean per 30 second bin.

Figure 12:
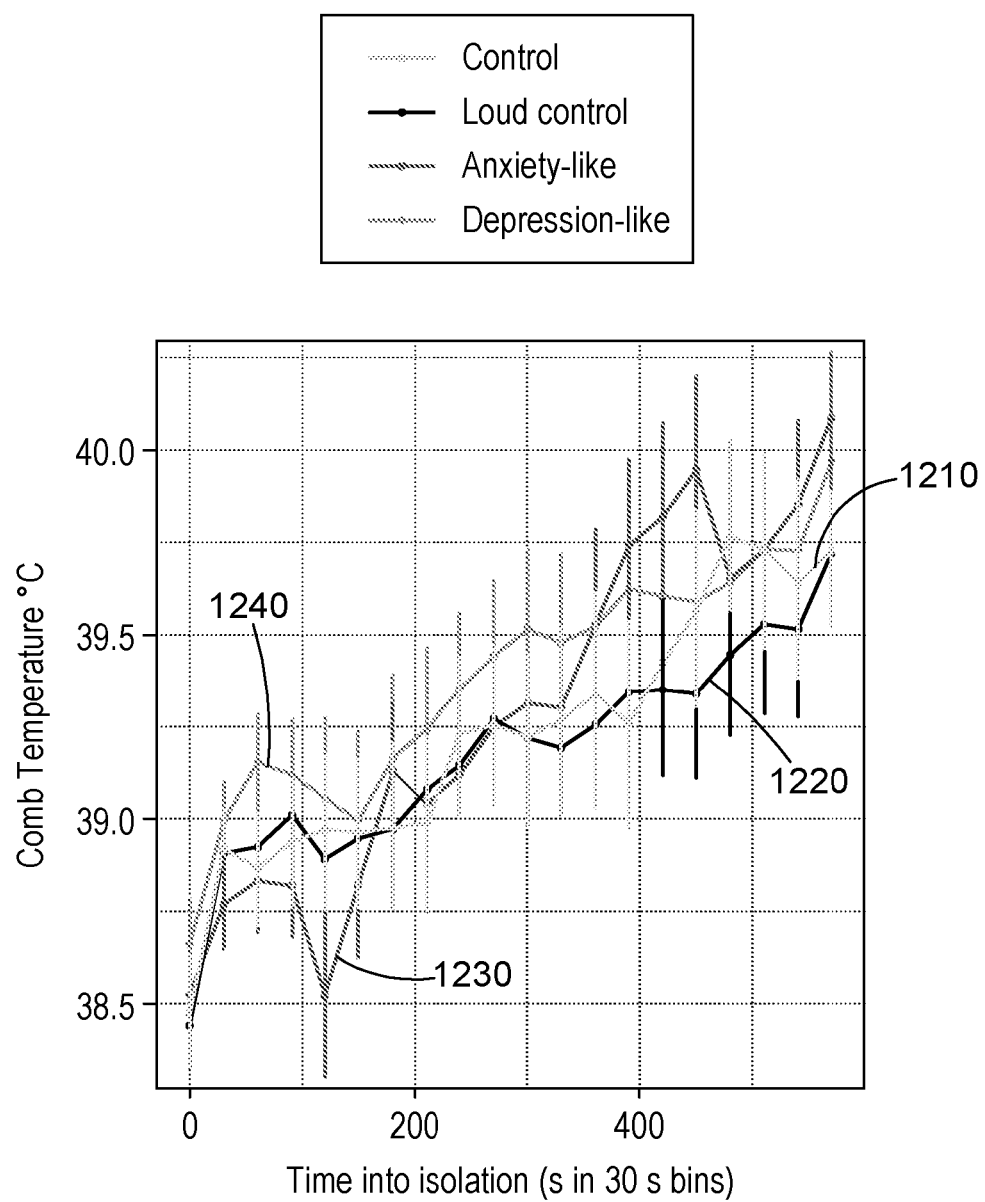
FIG. 12 is a graph showing a relationship between change in comb temperature over time in isolation.

FIG. 12 is a relationship between the change in comb temperature over 10 minutes in isolation. The relationship is shown for different audio playback treatments: a control 1210, a loud control 1220, anxiety-like playback 1230, and depression-like playback 1240. Error bars indicate 1 standard error of the mean per 30 second bin. A greater comb temperature increase was indicative of a stronger acute stress response to isolation. That is, an increased comb temperature is indicative of a chick having increased stress.

Figure 13:
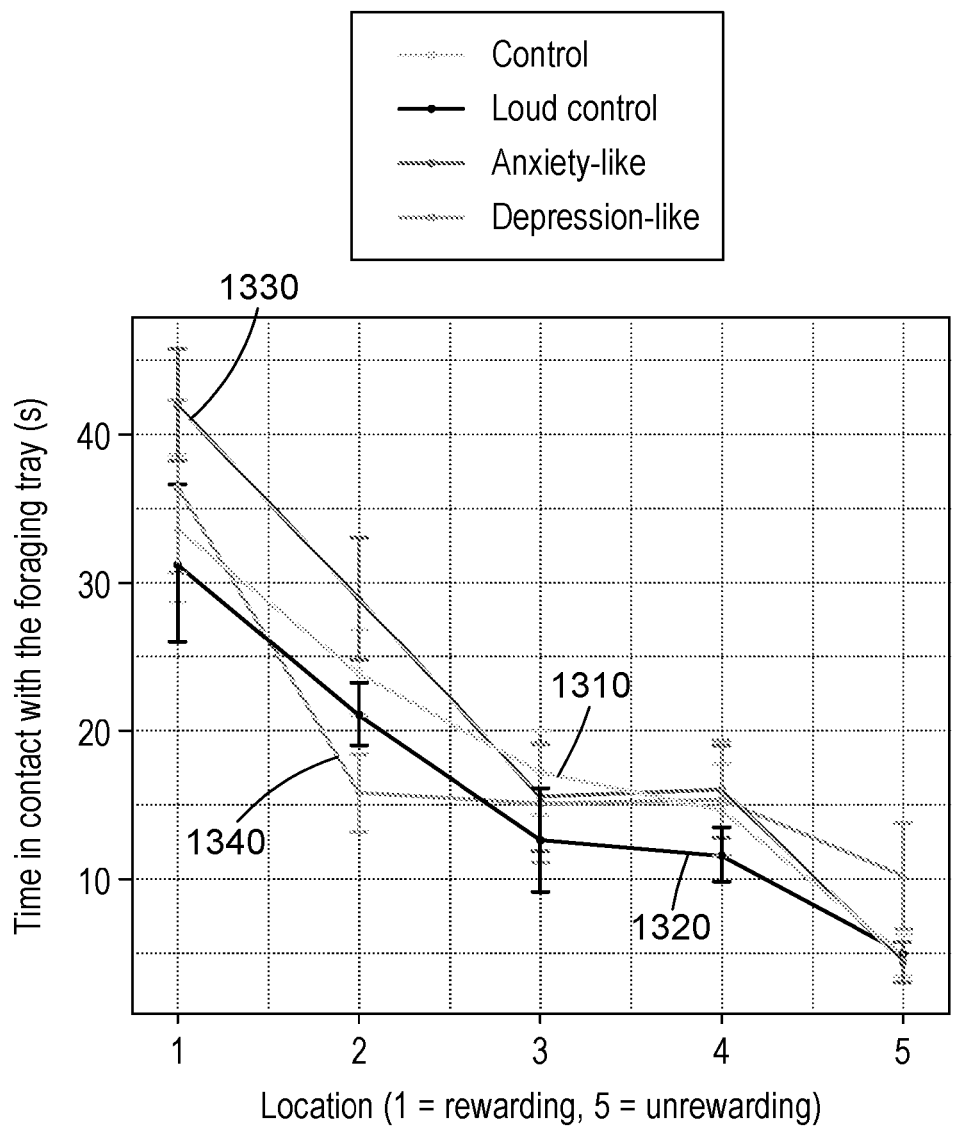
FIG. 13 is a graph showing a relationship between time spent in contact with foraging trays when positioned in specific locations.

FIG. 13 is a relationship between time of 1 minute spent in contact with foraging trays when positioned in each of 5 equidistant locations from a known rewarding location (1) to a known unrewarding location (5). The relationship is shown for different audio playback treatments: a control 1310, a loud control 1320, anxiety-like playback 1330, and depression-like playback 1340. Error bars show 1 standard error of the mean per location.

We have found it advantageous to measure the level of distress calling in chicks, and to control the environment in which they are reared responsive thereto. Chicks emit a repetitive high energy distress call when they are stressed. This is especially prevalent early in the life of chickens. We have found that it is especially important to monitor the levels of distress calling when chicks are between for example about 3 to 7 days of age, and the welfare at this stage, as evidenced by distress calling, affects their growth rate and emotional state at commercial slaughter age.

It is possible to detect individual distress calls from individual animals, but we have found it advantageous to monitor the sounds made by a plurality of animals around microphones. Microphones are spaced apart throughout the livestock enclosure, between feeders and drinkers. Their sensitivity is selected to detect animal vocalisations within a radius of about 10 to 20 m. Sounds is recorded periodically, e.g. 1 minute of sound is recorded every 10 minutes. Windows of sounds, typically 10 to 120 s are records and processed. Recorded sounds are filtered to extract sound in a wavelength range, e.g. 2.75 to 5 kHz.

Stress parameters can be calculated in several ways. Firstly, we have found it advantageous to calculate the spectral entropy of the filtered recorded sounds. We have found that this correlates with chick distress calling and is predictive of chick growth and welfare.

In addition, we have processed measured sound into the frequency domain with Fast Fourier Transform and analysed skewness, kurtosis, fundamental frequency and power in fundamental frequency. We have found that varying distress is associated with changes in these parameters. A decrease in skewness may indicate greater stress; a decrease in kurtosis may indicate greater stress; and increase in the fundamental frequency of the sound may indicate greater stress; an increase in power at the fundamental frequency may indicate greater stress.

We measure spectral entropy, or another measure of distress calling, particularly during the fourth day of life, or fifth day of life (or fourth day from placement, which may be one day from hatching) of chicks. We have found that this correlates well with the ultimate growth, health and wellness of chicks at the time of slaughter.

We have found that early life distress calls and other calls indicative of emotions are contagious amongst chickens. Chickens which are distressed early in life (e.g. around day 4) may continue to generate high levels of distress calls throughout life.

This has two implications. Firstly, welfare parameters can be calibrated taking into account measurements of distress calling (e.g. the spectral entropy of measured sound) earlier in the life of the animals, thereby improving the accurate of estimates of welfare parameters.

Secondly, the controller may use the loudspeakers to play sounds to the animals, particularly sounds associated with pleasure, although potentially distress calls, to reduce the spread of contagious emotions and/or to improve animal wellbeing and/or growth rate.

REFERENCES

Collias, N., Joos, M. 1953. The Spectrographic Analysis of Sound Signals of the Domestic Fowl. Behaviour 5: 175-188

Fontana, I., Tullo, E., Carpentier, L., Berckmans, D., Butterworth, A., Vranken, E., Norton, T., Berckmans, D., Guarino, M. 2017. Sound analysis to model weight of broiler chickens. Journal of Poultry science 96: 3938-3943

Manteuffel, G., Puppe, B., Schon, P. C. 2004. Vocalization of farm animals as a measure of welfare. Applied Animal Behaviour Science 88: 163-182

Marx, G., Leppelt, J., Ellendorff, F. 2001. Vocalisation in chicks (*Gallus gallus dom.*) during stepwise social isolation. Applied Animal Behaviour Science 75: 61-74

Mcloughlin, M. P., Stewart, R., McElligott, A. G. 2019. Automated bioacoustics: methods in ecology and conservation and their potential for animal welfare monitoring. Journal of the Royal Society Interface 16: 20190225

Sufka, K. J., Feltenstein, M. W., Warnick, J. E., Acevedo, E. O., Webb, H. E., Cartwright, C. M. 2006. Modeling the anxiety-depression continuum hypothesis in domestic fowl chicks. Behavioural Pharmacology 17: 681-689

Vandermeulen, J., Bahr, C., Johnston, D., Earley, B., Tullo, E., Fontana, I., Guarino, M., Exadaktylos, V., Berckmans, D. 2016. Early recognition of bovine respiratory disease in calves using automated continuous monitoring of cough sounds. Computers and Electronics in Agriculture 129: 15-26

Warnick, J. E., Huang, C. J., Acevedo, E. O., Sufka, K. J. 2009. Modeling the anxiety-depression continuum in chicks. Journal of Psychopharmacology 23: 143-156

White S. W., Sufka K. J. 2012. Chick Anxiety-Depression Screening Model. In: Szallasi A., Bíró T. (eds) TRP Channels in Drug Discovery. Methods in Pharmacology and Toxicology. Humana Press, Totowa, N.J.

The invention claimed is:

1. A method of determining one or more welfare parameters of a group of animals, the method comprising providing:
    a livestock enclosure having the group of animals therein; and
    a plurality of sensors arranged to make measurements in the livestock enclosure, the plurality of sensors comprising one or more audio sensors to detect sounds made by the group of animals,
    the method further comprising determining one or more welfare parameters from the measurements made by the plurality of sensors,
    wherein determining one or more welfare parameters comprises passing a frequency spectrum of sounds measured by the one or more audio sensors through one or more filters to isolate a frequency range specific to a distress call of interest and determining one or more stress parameters by calculating a spectral entropy of the filtered sounds, the spectral entropy of the filtered sounds indicative of a number of distress calls of the group of animals, and
    wherein the method further comprises analyzing the spectral entropy within a window of time extending until a threshold time which is less than 8 days of life.

2. A method according to claim 1, further comprising receiving measured weight gain of one or more animals of the group of animals, and correlating the measured weight gain with the spectral entropy of the filtered sounds to predict productivity of the group of animals.

3. A method according to claim 1, wherein the method comprises at least one of:
    outputting a determined welfare parameter; and
    calculating parameters concerning each of acute distress calls and chronic distress calls.

4. A method according to claim 1, wherein the welfare parameters of the animals are calculated taking into account previous measurements of sounds made by same or different animals using the sensors.

5. A method according to claim 1, comprising detecting changes in a volume and pitch of vocalisations made by the animals, to calculate welfare parameters amongst the animals in the livestock enclosure.

6. A method according to claim 1, comprising processing measurements from the one or more sensors either:
    taking into account the age of animals in the enclosure, or relative to a reference time.

7. A method according to claim 1, wherein the animals are chickens.

8. A method according to claim 1, wherein one or more welfare parameters are measured during rearing of a first group of animals in the livestock enclosure and environmental parameters, including a variation with time of environmental parameters, are varied during subsequent rearing of a second group of animals in a same or another livestock enclosure.

9. A method of regulating a livestock rearing apparatus, the method comprising:
    providing:
        a livestock enclosure having a group of animals therein;
        a plurality of sensors arranged to make measurements in the livestock enclosure, the plurality of sensors comprising one or more audio sensors to detect sounds made by the group of animals; and
        a plurality of output devices which control environmental parameters within the livestock enclosure,
    determining one or more welfare parameters from the measurements made by the plurality of sensors, and
    controlling an output from the plurality of output devices in dependence on the determined one or more welfare parameters,
    wherein the determining, of the one or more welfare parameters comprises passing a frequency spectrum of sounds measured by the one or more audio sensors through one or more filters to isolate a frequency range specific to a distress call of interest and determining one or more stress parameters by calculating a spectral entropy of the filtered sounds, the spectral entropy of the filtered sounds indicative of a number of distress calls of the group of animals, and
    wherein the method further comprises analyzing the spectral entropy within a window of time extending until a threshold time which is less than 8 days of life.

10. A method according to claim 9, wherein, in response to the measurements made using the one or more sensors, an output from the plurality of output devices is regulated, and varied over time, and/or wherein at least some of the output devices are lights and the outputs which are changed include a wavelength and/or intensity of light output by the lights.

11. A method according to claim 9, wherein one or more of the output devices is a sound generator, such as a loudspeaker, configured to direct sound at animals within the enclosure, wherein one or more sound generators are controlled to output animal vocalisations indicative of animal pleasure or distress.

12. A method according to claim 9, wherein the method further comprises analyzing weight gain of one or more of the animals in the livestock enclosure, and taking this into account when determining environmental parameters, or the relationship between outputs through the output devices in response to measurement using the sensors during subsequent growing cycles.

13. A method according to claim 9, comprising regulating the output of the one or more output devices to reduce stress on the animals within the livestock enclosure.

14. A method according to claim 9 comprising regulating a frequency spectrum of light output through one or more lights or to change a temperature in the livestock enclosure to reduce animal stress, responsive to measurements of one or more animal stress parameters made using the sensors.

15. A method according to claim 1, comprising predicting next-day mortality amongst the animals in the livestock enclosure and/or correlating preventative actions and their subsequent effect on next-day mortality.

16. Livestock rearing apparatus comprising:
a livestock enclosure;
a controller; and
a plurality of sensors arranged to make measurements in the livestock enclosure, the plurality of sensors comprising one or more audio sensors to detect sounds made by a group of animals in the livestock enclosure,
wherein the sensors are in electronic communication with the controller, and wherein the controller is configured to determine one or more welfare parameters of the animals using measurements made by the one or more sensors by:
passing a frequency spectrum of sounds measured by the one or more audio sensors through one or more filters to isolate a frequency range specific to a distress call of interest;
determining one or more stress parameters by calculating a spectral entropy of the filtered sounds, the spectral entropy of the filtered sounds indicative of a number of distress calls of the group of animals, and
analyzing the spectral entropy within a window of time extending until a threshold time which is less than 8 days of life.

17. Livestock rearing apparatus of claim 16 comprising a plurality of output devices arranged to control environmental parameters within the livestock enclosure,
wherein the sensors and output devices are in electronic communication with the controller and the controller is configured to control the output from the plurality of output devices in dependence on the determination of one or more welfare parameters of the animals.

18. Livestock rearing apparatus according to claim 17, wherein the one or more audio sensors are located between 0.5 and 1.5 m above a floor of the livestock enclosure and spaced between drinkers and feeders.

19. Livestock rearing apparatus according to claim 16, wherein the one or more sensors comprise thermal imaging camera and data from the thermal imaging camera is processed to determine a temperature of a comb of one or more chickens and so to calculate a welfare parameter of the chickens.

20. A non-transitory data storage medium storing computer program instructions which when executed by a controller of a livestock rearing apparatus cause the livestock rearing apparatus, which comprises:
a livestock enclosure; and
a plurality of sensors arranged to make measurements in the livestock enclosure, the plurality of sensors comprising one or more audio sensors to detect sounds made by a group of animals in the livestock enclosure, wherein the sensors are in electronic communication with the controller,
to determine one or more welfare parameters of animals using measurements made by the one or more sensors by:
passing a frequency spectrum of sounds measured by the one or more audio sensors through one or more filters to isolate a frequency range specific to a distress call of interest;
determining one or more stress parameters by calculating a spectral entropy of the filtered sounds, the spectral entropy of the filtered sounds indicative of a number of distress calls of the group of animals, and
analyzing the spectral entropy within a window of time extending until a threshold time which is less than 8 days of life.

21. A method according to claim 7, wherein the method further comprises detecting levels of stress in the chickens in the livestock enclosure during their third, fourth or fifth day since hatching or placement in the livestock enclosure.

* * * * *